United States Patent
Jain et al.

(10) Patent No.: US 6,449,548 B1
(45) Date of Patent: Sep. 10, 2002

(54) AUTOMATIC TRANSMISSION SHIFT CONTROL

(75) Inventors: Pramod Kumar Jain, Farmington Hills; Balaram G. Sankpal, Canton; Bradley Dean Riedle, Northville; James M. Merner, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 51 days.

(21) Appl. No.: 09/783,116

(22) Filed: Feb. 14, 2001

(51) Int. Cl.⁷ .............................................. G06F 17/00
(52) U.S. Cl. ........................... 701/56; 701/51; 701/53; 701/60; 477/143; 475/149
(58) Field of Search ............................. 701/51, 53, 54, 701/55, 56, 60, 61; 477/121, 143–146, 94, 149, 147, 154, 155; 475/128, 149, 123; 192/3.3, 3.33, 3.31, 3.29

(56) References Cited

U.S. PATENT DOCUMENTS

| 4,509,389 A |   | 4/1985  | Vahratian et al. ............. 473/66 |
| 5,029,087 A | * | 7/1991  | Cowan et al. ................ 192/3.3 |
| 5,081,886 A |   | 1/1992  | Person et al. ................ 477/131 |
| 5,083,481 A | * | 1/1992  | Smith et al. ................. 477/158 |
| 5,150,297 A |   | 9/1992  | Daubenmier et al. ......... 701/66 |
| 5,157,608 A |   | 10/1992 | Sankpal et al. ............... 701/58 |
| 5,303,616 A |   | 4/1994  | Palansky et al. .............. 477/63 |
| 5,305,663 A |   | 4/1994  | Leonard et al. ............. 475/123 |
| 5,383,825 A |   | 1/1995  | El-Khoury et al. ......... 477/149 |
| 5,460,582 A |   | 10/1995 | Palansky et al. ............ 477/138 |
| 5,474,506 A |   | 12/1995 | Palansky et al. .............. 477/63 |
| 5,476,425 A | * | 12/1995 | Shiraishi et al. ............ 477/109 |
| 5,553,694 A |   | 9/1996  | Schulz et al. ................ 192/3.3 |
| 5,580,331 A | * | 12/1996 | Shiraishi et al. ............ 477/109 |
| 5,586,029 A |   | 12/1996 | Schulz et al. ................. 701/51 |
| 5,646,842 A |   | 7/1997  | Schulz et al. ................. 701/51 |
| 5,722,519 A |   | 3/1998  | Kirchhoffer et al. ......... 152/3.3 |
| 5,758,302 A |   | 5/1998  | Schulz et al. ................. 701/51 |
| 5,809,442 A |   | 9/1998  | Schulz et al. ................. 701/51 |
| 5,835,875 A |   | 11/1998 | Kirchhoffer et al. ......... 701/51 |
| 6,099,435 A | * | 8/2000  | Halene et al. ............. 192/3.29 |

* cited by examiner

Primary Examiner—Jacques H. Louis-Jacques
(74) Attorney, Agent, or Firm—Frank G. McKenzie

(57) ABSTRACT

An automatic transmission ratio shift control system and method for a powertrain having a throttle-controlled engine and multiple-ratio gearing, torque flow paths through the gearing being established and disestablished by pressure-operated friction elements, an electronic controller for establishing torque transitions between the friction elements as ratio changes occur in the multiple-ratio gearing, the engine throttle being controlled by an electronic throttle control that is decoupled from the driver-controlled accelerator pedal, the transmission torque output being controlled by means of a friction element capacity control strategy including a feed-forward torque term determined by changes in commanded torque, the slip duration during a ratio change being controlled by means of closed-loop engine torque control.

13 Claims, 5 Drawing Sheets

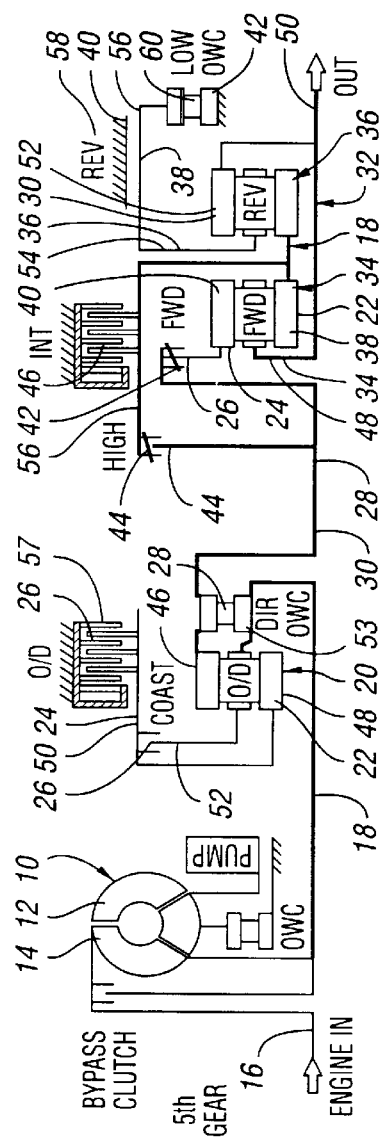

AUTOMATIC TRANSMISSION SHIFT CONTROL

BACKGROUND OF THE INVENTION

1. Field of the Invention

The invention relates to a system and method for controlling ratio changes for a multiple-ratio transmission in a vehicle driveline having an engine with an electronic throttle control.

2. Background Art

Automatic transmissions used in contemporary vehicle powertrains include multiple-ratio gearing wherein the torque flow paths through the gearing elements and the relative speeds of the gearing elements are controlled by fluid pressure-operated friction elements; i.e., friction clutches and brakes. The management of the torque transfer through the gearing from the throttle-controlled engine to the traction wheels is achieved by a control system having an electronic controller that responds to powertrain variables, including engine variables and driver commands.

The control system develops clutch and brake control pressure, which is determined by solenoid valves under the control of the controller. Typically, a fluid pressure circuit would include a solenoid valve dedicated to circuit pressure control, and a separate solenoid valve circuit to effect control of the pressure-operated clutches and brakes during upshifts and downshifts.

In the transmission disclosed in application Ser. No. 09/636,729, filed Aug. 10, 2000, now U.S. Pat. No. 6,385,520, a separate sulenoid valve is provided for controlling each ratio shift, the offgoing friction element being activated independently of the ongoing friction element during a ratio change.

Copending patent application Ser. No. 09/366,416, filed Aug. 4, 1999, now U.S. Pat. No. 6,253,140, describes engagement control logic wherein the ratio changes occur with an adaptive engagement feel. The controller for this transmission control provides consistent, smooth engagement of a friction element during vehicle startup. It includes a controller with an adaptive strategy that maintains consistent shift quality and takes into account system variations, such as changes in coefficient of friction. friction element wear, etc. Actual slip rate during engagement of die friction element is maintained at a desired value.

Each of these copending patent applications is assigned to the assignee of the present invention.

In prior art systems corresponding to those described in the copending patent applications, the control strategy for the friction elements involves a direct relationship between the transmission output torque control and the ratio change time control. This may require a compromise in shift quality because optimum transmission output torque control is not necessarily consistent with optimum ratio shift timing control. The control strategy of known transmission systems for controlling friction element capacity must be changed rapidly in a controlled fashion to match varying engine torque. The friction elements may not have a response to control commands that is fast enough to accomplish a smooth ratio change, which results in lower shift quality. Furthermore, variations in shift quality on a shift-to-shift basis may occur.

Another related copending application, which also is assigned to the assignee of the present invention, is Ser. No. 09/665,353, filed Sep. 18, 2000, now U.S. Pat. No. 6,278,926. It discloses a multiple-ratio gear system in which independent pressure control of separate friction elements is achieved using separate variable force solenoids. A microprocessor receives input continuously from driveline sensors and stores and executes a control logic for controlling the oncoming friction element during a ratio change. Information that is learned from the input signals is executed on a real-time basis to calculate clutch pressures to achieve optimum shift quality.

The disclosures of the copending patent applications are incorporated in the present disclosure by reference to supplement the present disclosure.

In each of the systems disclosed in the copending patent applications, the slip time during a ratio change is controlled by controlling friction element pressure. That is, the controller controls the solenoid valves that determine friction clutch pressure.

SUMMARY OF THE INVENTION

The control system and method of the invention uses a closed-loop controller to achieve the desired ratio rate during a shift from one gear ratio to the next. The ratio rate is a function of accelerator pedal position. Concurrently, the transmission output torque is controlled using a friction element capacity control strategy. The friction element capacity control involves a determination of the desired wheel torque using a torque feed-forward term. This provides a quick response to changes in transmission input torque.

The accelerator pedal in the system of the invention is decoupled from the engine throttle. This is achieved by using an electronic throttle control, under the control of the vehicle operator, which is not mechanically connected directly to the engine throttle. Control logic is used to interpret a driver demand for torque by sensing the movement of the accelerator pedal. Controlling the input torque to a manageable level results in a smooth torque transition during a ratio change and reduces variation in shift quality from one shift to the next.

Engine torque is controlled using the system and method of the invention by using a closed-loop controller to achieve a desired ratio change rate, as mentioned above. The controller establishes a commanded ratio rate during a ratio change interval and compares it to the actual ratio rate to detect an error. A commanded engine torque then is established, which reduces the error.

Torque capacity control of the friction elements, unlike the closed-loop control of the engine torque, is an open-loop control in which the desired wheel torque is determined by the controller as speed inputs are received by the controller from an engine speed sensor, a turbine speed sensor and an output shaft speed sensor. The controller establishes a desired vehicle wheel torque as a function of accelerator pedal position. It calculates friction element pressure to achieve optimum friction element capacity during a ratio change interval.

A transmission that would embody the control logic of the invention may include a hydrokinetic torque converter in which the impeller is driven by the engine. The converter turbine would be coupled directly to the output shaft through multiple-ratio gearing.

The system of the invention includes sensors for measuring engine speed, turbine speed, torque output shaft speed and accelerator pedal position. An electronic controller in the system has a first portion in communication with the sensors. A processor unit calculates a commanded ratio rate and an actual ratio rate during a ratio change interval and determines an error between the commanded ratio rate and the actual ratio rate. A second portion of the electronic controller has a processor for calculating engine torque. as a function of the ratio rate error. A third portion of the processor calculates engine control parameters in a closed-loop fashion as a function of the commanded engine torque.

Another aspect of the invention is a ratio change control method wherein engine speed, turbine speed and torque output shaft speed are measured as other steps are carried out including calculating driver demand for engine torque, commanded and actual ratio rates during a ratio change interval, desired traction wheel torque as a function of the driver demand for engine torque, friction element pressure in an open-loop fashion based on the desired traction wheel torque, determining an error between the commanded ratio rate and the actual ratio rate, calculating a commanded engine torque as a function of ratio rate error, and calculating engine control parameters in a closed-loop fashion as a function of the driver demand for engine torque.

BRIEF DESCRIPTION OF THE DRAWINGS

FIG. 1 is a schematic representation of a transmission having a torque converter and multiple-ratio gearing, the gearing elements being controlled by friction clutches and brakes;

FIG. 2 is a chart that shows the clutch and brake engagement-and-release pattern for the transmission, schematically illustrated in FIG. 1, as the various multiple, forward-driving ratios and the reverse ratio are established;

DETAILED DESCRIPTION OF AN EMBODIMENT OF THE INVENTION

Figure 3:
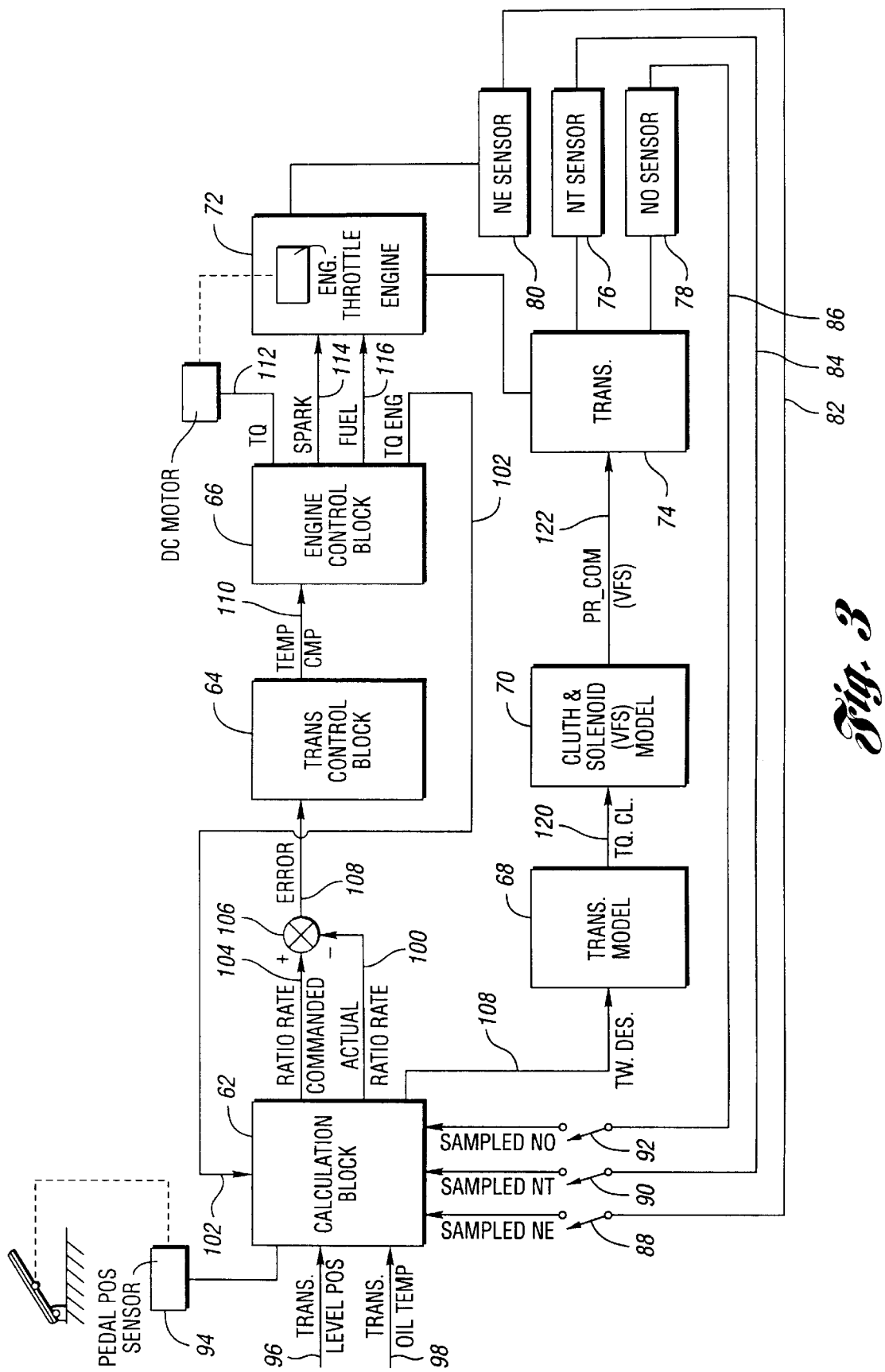
FIG. 3 is a schematic block diagram of the control system together with the signal flow paths between the controller and the transmission and between the controller and the engine.

FIG. 1 shows in schematic form a multiple-ratio transmission for an automotive vehicle capable of embodying the improved control method and strategy of the invention. The transmission of FIG. 1 is merely one example of a multiple-ratio transmission that can utilize the control logic of the present invention. The invention is not restricted to the specific transmission illustrated in FIG. 1.

Numeral 10 in FIG. 1 designates a hydrokinetic torque converter that has an impeller 12 and a turbine 14 arranged in known fashion in a toroidal fluid flow circuit. The impeller 14 is connected to the crankshaft of an internal combustion engine, as shown at 16.

Turbine 14 is connected to turbine shaft 18, which delivers torque to the carrier of an overdrive simple planetary gear unit 20. Sun gear 22 of the gear unit 20 is connected to overdrive brake drum 24. An overdrive disc brake 26 distributes reaction torque to the transmission housing when it is applied, thereby effecting an overdrive condition for the gear unit 20. A coast clutch 27 directly connects the carrier for the gear unit 20 to the sun gear 22, thereby accommodating a reverse torque transfer from the vehicle wheels to the engine through the converter.

An overrunning coupling 28 establishes a direct driving connection between the turbine shaft and torque transfer shaft 30.

Shaft 30 serves as a torque input shaft for compound planetary gearing 32, which comprises gear units 34 and 36 with a common sun gear 38. Ring gear 40 of gear unit 34 is connected to shaft 30 through a forward-drive clutch 42. Sun gear 38 is connected to shaft 38 through a high-ratio clutch 44. Sun gear 38 can be braked by an intermediate speed ratio brake 46 when the clutch 44 is disengaged. The carrier 48 for the gear unit 34 is connected to torque output shaft 50.

Ring gear 52 for the gear unit 36 is connected to shaft 50. The carrier 54 for the gear unit 36 is connected to reverse brake drum 56. Reverse brake band 58 surrounds drum 56 and anchors the carrier 54 during reverse drive. During forward drive in the lowest speed ratio, brake drum 56 is anchored to the transmission housing through overrunning coupling 60.

FIG. 2 is a chart that shows the clutch and brake engagement-and-release pattern for each of the forward driving ratios and the reverse ratio. The symbol X represents an engaged friction element. The symbol C represents a coasting condition for the coast clutch and the reverse brake. Symbol O/R represents an overrunning condition of the overrunning coupling.

The schematic diagram of FIG. 1 represents the condition of the friction elements when the transmission is conditioned for overdrive fifth ratio operation. At that time, the clutch 42 and the clutch 44 are engaged, and the overdrive brake 26 is applied.

The overall control system is illustrated in block diagram form in FIG. 3. A microcontroller for the powertrain includes a calculation block 62, a transmission control block 64, an engine control block 66, a transmission control model 68, and a clutch and solenoid model 70. The engine is represented by control block 72, and the multiple-ratio transmission is represented by control block 74. The transmission includes a turbine speed sensor 76 and an output shaft speed sensor 78. An engine speed sensor is shown at 80.

Feedback control signal flow paths extend from the engine speed sensor 80, the turbine speed sensor 76, and the output speed sensor 78 through signal flow paths 82, 84 and 86, respectively. The signal flow paths extend to the calculation block where the signals are distributed to an input signal conditioning portion of the calculation block 62 through sampling switch 88 for the engine speed signal, switch 90 for the turbine speed signal, and switch 92 for the output shaft speed signal.

The control system includes a driver-controlled accelerator pedal, which is decoupled from the engine throttle; that is, there is not a direct mechanical connection between the accelerator pedal and the engine throttle. A pedal position signal from sensor 94 is distributed to the calculation block 62. A transmission control lever under the control of the operator selects the transmission range, an appropriate transmission lever position signal being distributed to the calculation block as shown at 96. A transmission oil temperature signal is distributed to the calculation block 62, as shown at 98.

The calculation block receives the speed signals from the engine speed sensor, the turbine speed sensor and the output shaft speed sensor and calculates an actual ratio rate during a shift interval, as shown at 100. A calculated engine torque is distributed to the calculation block a shown at 102.

The calculation block determines a commanded ratio rate, as shown at 104, as a function of the pedal position at 94 and the computed engine torque at 102. The commanded ratio rate at 104 is compared to the actual ratio rate 100 at the summing point 106. This determines an error in the ratio rate, as shown at 108. The error is transmitted to the transmission control block 64, which determines a commanded engine torque signal at 110. The engine control block 66 receives the commanded engine torque signal and develops control variables for the engine 72. These variables include a commanded throttle position signal, as shown at 112. It also determines the calculated engine torque signal 102, which, as mentioned previously, is received by the calculation block 62.

The engine control variables determined by the engine control block 66 include a spark timing control signal 114 and a fuel injection rate signal 116. In the alternative, the spark signal alone or the fuel signal alone could be used. In any case, the signals at 114 and 116, together with the commanded throttle position signal at 112, control engine torque.

The calculation block 62 calculates also a desired torque at the wheels, as shown at 118. This is distributed to the transmission control model 68, which develops a value for clutch (friction element) torque based upon the desired torque at the wheels, as shown at 120. The torque signal at 120 is used by the clutch and solenoid model to the develop the variable-force solenoid pressure at 70. The output signal developed at block 70 is a variable-force solenoid signal representing the commanded pressure for the clutches (friction element), as indicated at 122. The pressure-operated friction elements of the transmission 74 are engaged by the variable-force solenoid pressure determined at block 70.

The pressure applied to the friction elements of the transmission are determined by the torque desired value produced by the calculation block 62 in an open-loop fashion. This is in contrast to the closed-loop control of the engine torque. As in the case of the controllers described in the copending patent applications Ser. Nos. 09/665,353, 09/366,416, and 09/636,729, each of the feedback signals from the transmission and from the engine are speed signals used by the calculation blocks of the respective control systems to develop an actual ratio rate that can be compared to a desired ratio rate.

As in the case of the control systems of the copending patent applications previously discussed, the shift control logic of the present invention consists of four distinct modes. These are the shift start mode, the ratio change mode, the torque ramp mode and shift end mode. The same logic applies to both upshifts and downshifts, although there are some differences. The calibration involved in the shifts are unique for each shift.

During each control loop of the controller, the exit conditions for the current mode are checked prior to entry into the next mode. If the exit conditions for the current mode are satisfied, then the control logic may proceed during the ratio change to the next mode. Otherwise, the control remains with the current mode.

The control logic is executed and the output control signals transmitted to the solenoids that control the friction elements of the transmission are sensed in real time. This is done in response to the engine, transmission and output shaft speed signals previously discussed, as well as to the pedal position, range selector position and oil temperature signals.

During the shift start mode, the desired static torque capacity of the friction element is computed based on input torque and inertia torque. A dynamic pressure term, which is a function of pedal position and vehicle speed, is added to the desired static pressure to produce a commanded pressure (pr_cmd). The commanded clutch pressure is illustrated at 125 in FIG. 6. Commanded clutch (friction element) pressure (pr_cmd) is computed as follows:

$$\text{base clutch press} = [(tq\_trans + tq\_i\alpha)\text{MLTQ/GAIN} + \text{PRST} - \text{CF}*(\text{NT}/1000)^2]* \qquad (1)$$

$$\text{dyn press} = \text{FN}(\text{PP}, V_s) \qquad (2)$$

$$\text{pr\_cmd} = (\text{base press} + \text{dyn.press})*\text{FNMLT(temp)} \qquad (3)$$

In equation 2, the symbol PP is the pedal position value, and the symbol $V_s$ is the vehicle speed value. In equation 1, the symbol tq_trans represents transmission torque, and the symbol tq_iα represents inertia torque. Symbol MLTQ is the ratio of clutch torque to input torque, and the symbol GAIN is gain of the oncoming clutch. The symbol PRST is the stroke pressure.

In equation 3 above, the term FNMLTE is a temperature compensation multiplier developed during calibration.

Figure 4:
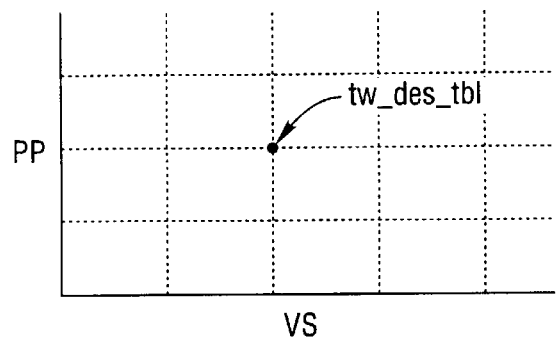
FIG. 4 is a schematic illustration of table values for desired torque stored in a ROM memory portion of the controller, the table values being determined by vehicle speed and pedal position.

The control strategy for the ratio change mode involves controlling the pressure of the oncoming friction element to obtain the desired wheel torque. A torque feed-forward term is used to provide a quick response to changes in the transmission input torque. The oncoming friction element pressure is computed in equations (4) as follows:

$$\text{tw\_dl\_ff} = \text{filter}\{(\text{tw\_des\_tbl} - \text{tw\_strt})*\text{FNMLPP}(\text{pps\_rel})\} \qquad (4)$$

$$\text{tw\_dl\_des} = \text{filter}[\{\text{FNTWDL}(\text{pcsftcmpt}), \text{pps\_rel}\} + *\text{FNFRRBCL}(\text{loop}_{counter})]$$

$$\text{tw\_des} = \text{filter}[\{\text{tw\_strt} + (\text{tw\_dl\_des} + \text{tw\_dl\_ff})*\text{MLTW}*\text{temperature\_MULT}\}]$$

$$\text{tq\_turb} = (\text{net engine torque} - \text{tq\_pump})*\text{TR}$$

$$\text{tq\_loss\_trans} = \text{tq\_spin} + \text{tq\_prop}*\text{tq\_turbine}$$

$$\text{tq\_cl} = \{\text{tw\_des/overall\_ratio} + \text{FRLOSS}*\text{tq\_loss\_trans}\}*\text{MLTQCL} - \text{cc}*\text{tq\_turb}$$

$$\text{pr\_cmd\_cl} = \text{tq\_cl/gain} + \text{stroke\_pressure} - \text{centrifugal\_force\_press}$$

$$\text{pr\_dl\_acm} = \text{PRDLAC}/*\text{incremental accumulator pressure from spring only}*/$$

$$\text{pr\_cmd\_sol} = \text{pc\_cmd\_cl}*\text{MUPRVF} + \text{INPRVF} - \text{pr\_dl\_acm}$$

where,
ppx_rel=pedal position
tw_strt=wheel torque at the start of ratio change mode
tw$_{\_dl\_}$des=additional desired wheel torque during ratio change
tw_des=total desired wheel torque
tq_turb=net turbine torque tq_loss_trans=transmission torque losses
tq_pump=pump loss
tq_spin=transmission spin losses
tq_prop=transmission torque proportional losses
tq_cl=friction element torque desired
pr_cmd_cl=commanded friction element pressure
pr_dl_acm=incremental accumulator pressure
pr_cmd_sol=solenoid commanded pressure
TR=torque converter torque ratio
FRLOSS=fraction of total losses between the friction element and the trans. output
MLTQCL=percent of turbine torque carried by the friction element (computed from diagram of FIG. 1)
FNMLPP=desensitizing function to minimize small pedal position movement affect
FNTWDL=desired wheel torque adder
FRTW=desired wheel torque fractional multiplier
FNFRRBCL=multiplier for shaping at the start of ratio change
MLTW=fractional multiplier
MUPRVF=slope factor for conversion to solenoid pressure
INPRVF=intercept factor for conversion to solenoid pressure
cc=conversion constant In the preceding discussion, the term tw_des_tbl is a table value that is obtained from a table stored in ROM, as indicated in FIG. 4. The desired torque stored in ROM is determined by the pedal position signal pps_rel and the vehicle speed signal $V_s$. The table of FIG. 4 is a "lookup" table.

Unlike friction element capacity control, the ratio rate is controlled using engine throttle in a closed-loop fashion. This achieves a desired ratio rate when changing from a previous gear ratio to the next gear ratio.

The ratio rate is a function of pedal position, as mentioned earlier. For an upshift, the starting value of desired engine torque is calculated as follows:

$$te\_cmd\_base@1^{st}\ loop=tq\_net*function(pps\_rel, V_s) \quad (5)$$

Figure 7:
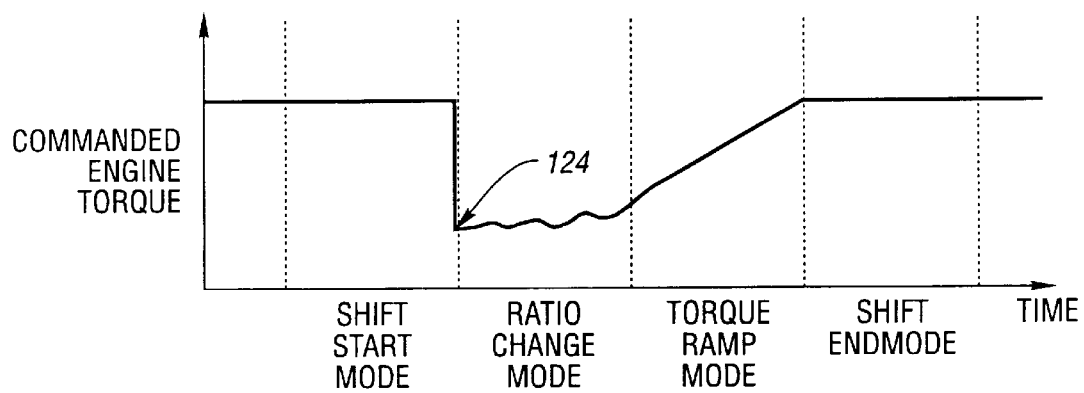
FIG. 7 is a plot of the commanded engine torque versus time for each stage of the shift.

In the foregoing equation, the term tq_net is the calculated engine torque shown at 102 in FIG. 3. When this value is multiplied by the multiplier in equation 5, a commanded torque is obtained as shown at point 124 in FIG. 7.

For a downshift, the starting value of desired engine torque is calculated as follows:

$$te\_cmd\_base@1^{st}\ loop=\{tq\_fead+tq\_pump+[tw\_strt/(rt\_gr\_(prev)*final\_drive)+tq\_spin-tg\_i\alpha]/[TR*(1-tq\_prop)]\}*MLLSTE \quad (6)$$

In the preceding equation (6), the term tq_spin represents spin losses, and the term tq_iα represents inertia torque losses.

Control logic that is common to all shifts, both upshifts and downshifts, is as follows:

$$rtr\_cmd=FNFRRC\ (normalized\ ratio)/FNTMDSRC\ (pps\_rel) \quad (7)$$

$$err\_t0=rtr\_cmd-rtr\_act\ (actual\ ratio\ rate)$$

$$te\_dl\_pid=\{Kp*(err\_t0-err\_t1)+Kd*(err\_t0-2*err\_t1+err\_t2)+Ki*err\_t0)\}*FNFRRBTE\ (loop\ counter)$$

$$te\_cmd\_base=te\_cmd\_base+te\_dl\_pid$$

$$te\_dl\_ff=tw\_dl\_ff/[rt\_gr\_(old/prev)*fdr]\ (\text{"prev" means gear coming from, "old" is the gear previous})$$

$$te\_cmd=(te\_cmd\_base+te\_dl\_ff)*temperature\_mult$$

where:
tq_fead=front-end accessory drive torque loss
te_dl_ff=change in desired engine torque due to change-of-mind
te_cmd=engine torque desired
rtr_cmd=ratio rate commanded
fdr=final drive ratio
MLLSTE=fractional losses between friction element and the transmission input
FNFRRC=shaping function for ratio change
FNTMDSRC=ratio change time desired
FNFRRBTE=shaping function at the st art of ratio change
Kc=PID controller overall gain
Kp=PID controller proportional gain
Ki=PID controller integral gain
Kd=PID controller derivative gain
err_t0=current loop error
err_t1=control error of previous loop
err_t2=control error of two loops previous In the foregoing equations (7), the term te_cmd is the commanded engine torque that is achieved by adjusting spark timing or fuel. Alternatively, throttle position and either spark timing or fuel control can be used. In this way, the torque that is asked for is achieved. The term temperature_mult is a multiplier determined by calibration to take into account changes in transmission temperature.

During the torque ramp mode shown in FIGS. 5–11, the desired engine torque is calculated by interpolating between the current desired engine torque and the desired engine torque at the end of the shift. This is demonstrated by the following equations:

$$tw\_des\_end=tw\_strt+filter\{FNTWDS\ (V_s, pps\_rel)\ -tw\_strt\} \quad (8)$$

$$te\_des\_end=\{tq\_fead+tq\_pump+[tw\_des\_end/(rt\_gr\_(next/prev)*fdr)+tq\_spin-tq\_i\alpha]-tq\_i\alpha]/[TR*(1-tq\_prop)]\}*MLLSTE$$

$$te\_cmd=[(rt\_trans-rt\_trans\_1st)/(rt\_fin-rt\_trans\_1st)*(te\_des\_end-te\_cmd)]+te\_cmd$$

where:
te_cmd_mid=desired engine torque at the start of torque ramp mode
tw_desend=desired wheel torque at the shift end
te_des_end=desired engine torque at the shift end
te_cmd=desired engine torque for the current loop
rt_trans=current loop transmission ratio
rt_trans_1st=previous loop transmission ratio
FNTWDS=desired wheel torque
rt_fin=ratio at end of shift The routine will exit the torque ramp mode and enter the shift end mode if the maximum allowed time in the torque ramp mode has expired, or if the transmission ratio is less than the target value for an upshift or greater than the target value for a downshift.

Figure 6:
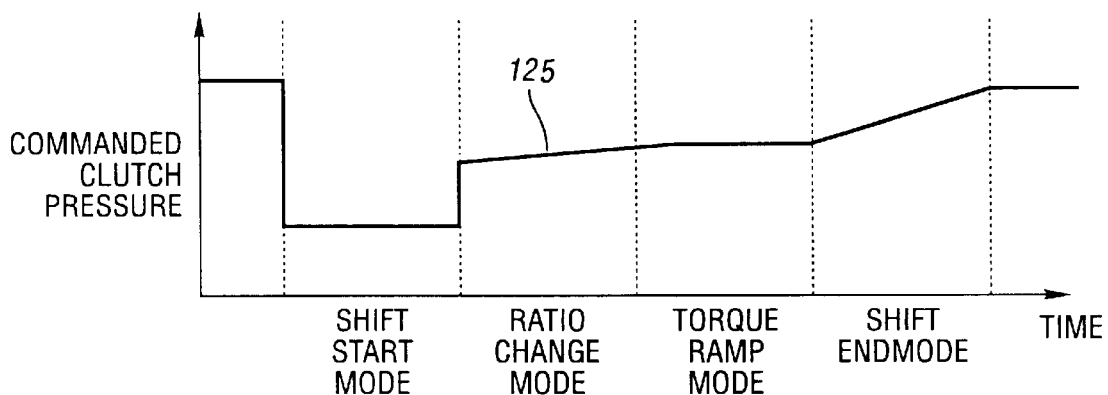
FIG. 6 is a plot of the commanded clutch pressure versus time during each stage of the ratio change.

The routine for the ratio change will enter the shift end mode and the friction element pressure will be ramped up until it reaches the line pressure, as shown in FIG. 6 at 125.

Figure 5:
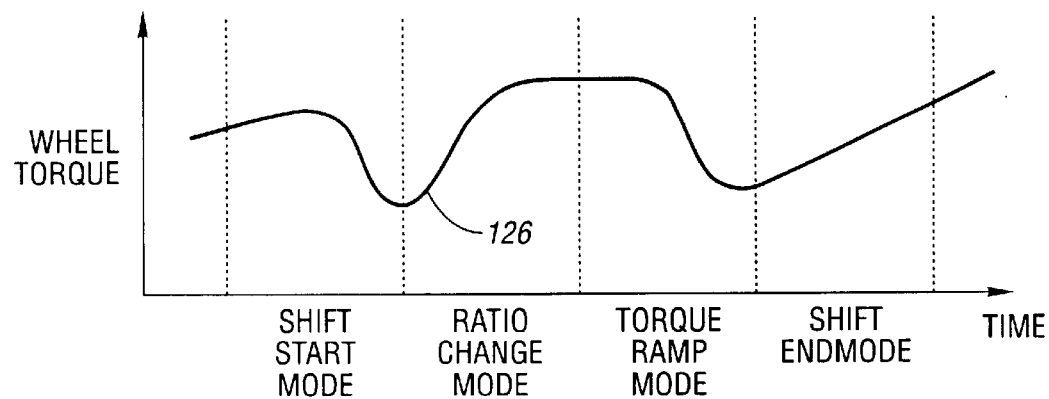
FIG. 5 is a plot of wheel torque versus time, which shows the variations in wheel torque at each of the multiple stages of a shift interval.

The effect of this is shown in FIG. 5 where the wheel torque desired is controlled to a value that is a function of pedal position and vehicle speed.

By employing the foregoing strategy, the capacity of the controlling friction element is changed rapidly in a controlled fashion so that the clutch capacity matches the varying engine torque. Shift variations on a shift-to-shift basis are reduced. Changes in pedal position during a shift are filtered and the signals are shaped to provide a smooth and manageable change in input torque consistent with the response characteristics of the controlling friction element.

The input torque during a speed change phase can be increased in accordance with the strategy of the invention, thereby partially compensating for the output torque dip caused by inertia effects. This is illustrated for part-throttle operation in FIG. 9 where the inertia effect on wheel torque for a control system that does not include an engine throttle position commanded signal is shown at 126. In contrast, the dotted line plot of FIG. 9 for the present invention shows the reduction in the output torque dip caused by inertia effects. This is illustrated at 128. This result is achieved by the present invention by reason of the fact that the additional variable, i.e., commanded throttle position is available, as well as spark timing and fuel control, unlike other systems where spark timing and fuel control only are available for controlling engine torque. Improved authority over the engine results in a less severe dip in wheel torque compared to plot 126 shown in FIGS. 5 and 9.

Figure 9:
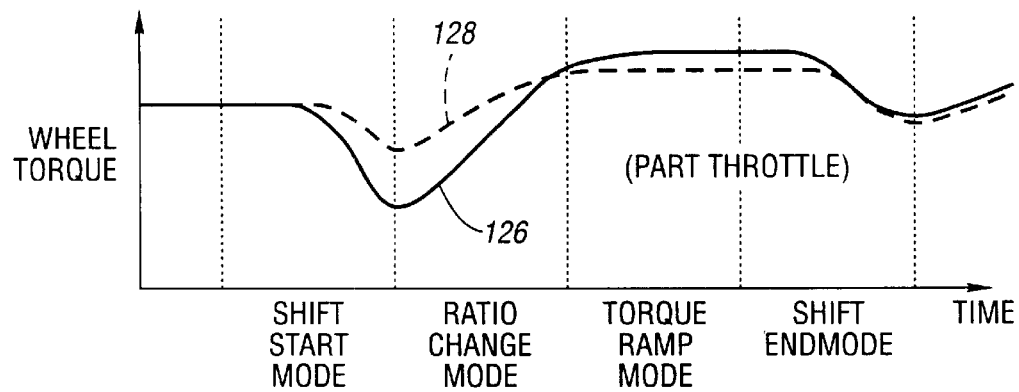
FIG. 9 is a plot of wheel torque versus time during a part throttle shift.
Figure 10:
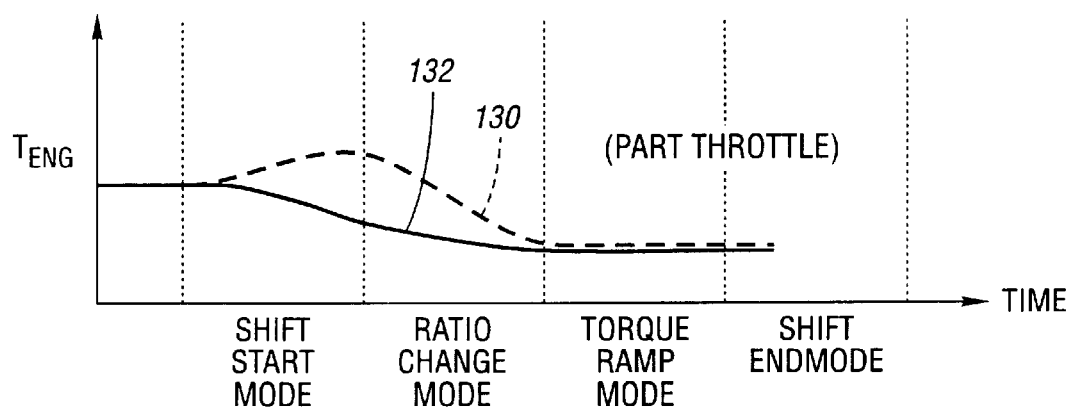
FIG. 10 is a plot of the engine torque for part throttle during each stage of the ratio shift.
Figure 11:
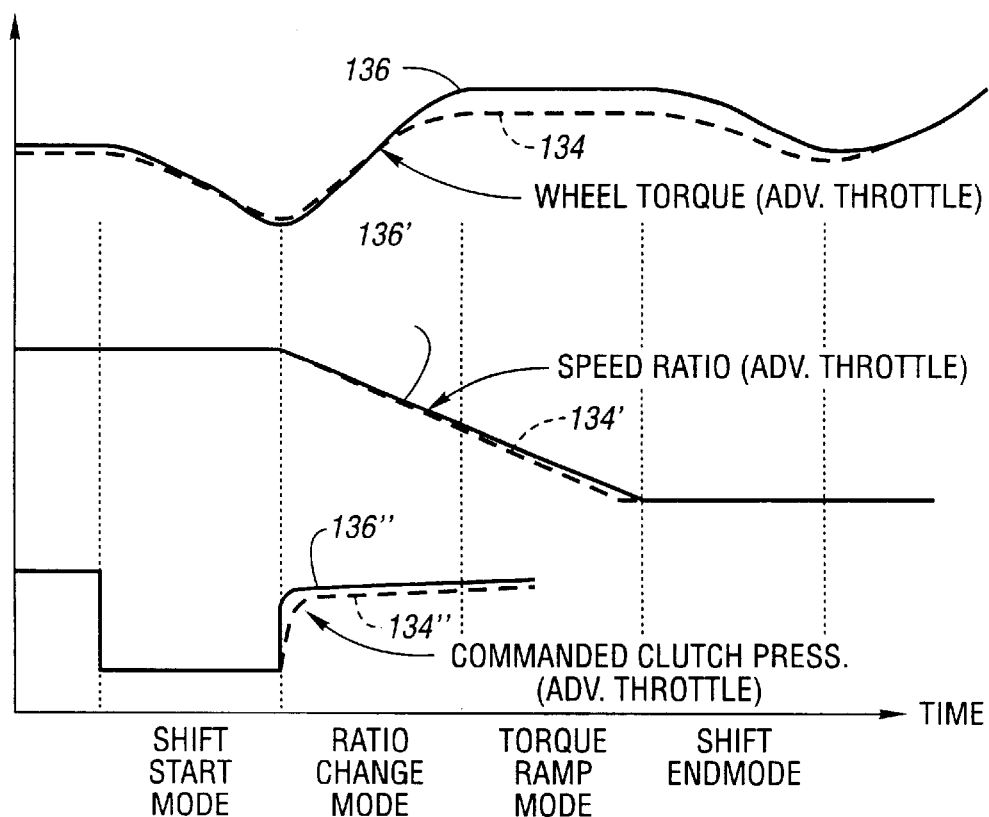
FIG. 11 is a plot of wheel torque, speed ratio and commanded clutch pressure during an advanced throttle shift for each of the stages of the ratio change.

FIG. 10 shows a plot of engine torque versus time during a shift interval, which results in the reduction in the torque dip seen in FIG. 9. Torque for part throttle is shown at 130 and the corresponding curve for a system that does not employ a commanded throttle pressure term is shown at 132.

At advanced throttle, the characteristics of wheel torque, the speed ratio and commanded clutch pressure are shown at 134, 134' and 134". The corresponding plots for a transmission control that does not include a commanded throttle position term are shown at 136, 136' and 136".

Figure 8:
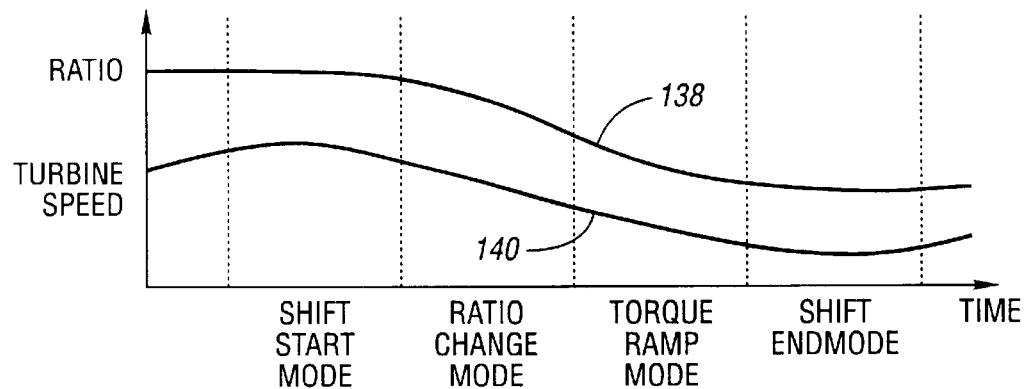
FIG. 8 is a plot showing variations in turbine speed and ratio versus time for each stage of the ratio change.

FIG. 8 is a plot of the transmission ratio during a ratio shift interval, as shown at 138. The turbine speed during the shift interval for each of the shift modes is shown at 140.

Although an embodiment of the control system and method of the invention has been disclosed, it will be apparent that modifications may be made by persons skilled in the art without departing from the scope of the invention. All such modifications and equivalents thereof are intended to be covered by the following claims.

What is claimed:

1. An electronic control system for controlling ratio changes in a multiple-ratio transmission for a powertrain for a wheeled vehicle, the powertrain including a throttle-controlled internal combustion engine;

the transmission including a hydrokinetic torque converter having an impeller connected to the engine and a turbine, multiple-ratio gearing and a torque output shaft connecting the turbine to vehicle traction wheels:

the electronic control system comprising:
an engine speed sensor for measuring turbine speed;
a turbine speed sensor for measuring turbine speed;
a torque output shaft speed sensor for measuring torque output shaft speed;
a driver-controlled accelerator pedal for establishing a commanded engine throttle position;
a pedal position sensor for establishing a pedal position signal; and
an electronic controller having a first portion in communication with the pedal position sensor, the engine speed sensor, the turbine speed sensor and the torque output shaft speed sensor, and comprising memory storage registers and a processor unit for calculating a commanded ratio rate during a ratio change interval in accordance with instruction in the memory storage registers based on speed data from the sensors, the calculations of the processor occurring during repetitive control loops of the controller;

the processor further calculating actual ratio rate during a ratio change interval and determining an error between the commanded ratio rate and the actual ratio rate;

the controller comprising a second portion having a processor unit for calculating a commanded engine torque as a function of the ratio rate error;

the controller comprising a third portion having a processor for calculating engine control parameters in a closed-loop fashion as a function of said commanded engine torque, one of the control parameters being commanded engine throttle position.

2. The electronic control system set forth in claim 1 wherein the engine control parameters include engine fuel rate control, the engine throttle position parameter, together with engine fuel rate control, providing increased authority over the engine in response to a change in accelerator pedal position.

3. The electronic control system set forth in claim 1 wherein the engine control parameters include engine spark timing, the engine throttle position parameter, together with engine spark timing control, providing increased authority over the engine response to a change in accelerator pedal position.

4. An electronic control system for controlling ratio changes in a multiple-ratio transmission for a powertrain for a wheeled vehicle, the powertrain including a throttle-controlled internal combustion engine;

the transmission including a hydrokinetic torque converter having an impeller connected to the engine and a turbine, multiple-ratio gearing and a torque output shaft connecting the turbine to vehicle traction wheels, the transmission having pressure-operated friction elements for controlling the gearing to effect ratio changes;

the electronic control system comprising:
an engine speed sensor for measuring engine speed;
a turbine speed sensor for measuring turbine speed;
a torque output shaft speed sensor for measuring torque output shaft speed;
a driver-controlled accelerator pedal for establishing a commanded engine throttle position;
a pedal position sensor for establishing a pedal position signal; and
an electronic controller having a first transmission control portion for establishing a desired vehicle wheel torque as a function of accelerator pedal position and a second transmission control portion for establishing a friction element pressure whereby optimum friction element capacity is established during a ratio change interval;

the electronic controller having a first engine control portion in communication with the pedal position sensor, the engine speed sensor, the turbine speed sensor and the torque output shaft speed sensor, and comprising memory storage registers and a processor unit for calculating a commanded ratio rate during a ratio change interval in accordance with instructions in the memory storage registers based on speed data from the sensors, the calculations of the processor occurring during repetitive control loops of the controller;

the processor further calculating actual ratio rate during a ratio change interval and determining an error between the commanded ratio rate and the actual ratio rate;

the controller comprising a second engine control portion having a processor unit for calculating a commanded engine torque as a function of the ratio rate error;

the controller comprising a third engine control portion having a processor for calculating engine control parameters in a closed-loop fashion as a function of said commanded engine torque, one of the control parameters being commanded engine throttle position.

5. The electronic control system set forth in claim 4 wherein the friction element capacity is controlled in an open-loop fashion;

the transmission including solenoid valve actuators for controlling friction element pressure as determined by calculated desired vehicle wheel torque.

6. The electronic control system set forth in claim 5 wherein the desired vehicle wheel torque calculated by the first transmission control portion is a function of a feed-forward term and accelerator pedal position, the feed-forward term being a table value in the controller memory storage registers corresponding to a vehicle speed term as determined by torque output shaft speed.

7. The electronic control system set forth in claim 4 wherein the engine control parameters include engine fuel rate control, the engine throttle position parameter, together with engine fuel rate control, providing increased authority over the engine in response to a change in accelerator pedal position.

8. The electronic control system set forth in claim 4 wherein the engine control parameters include engine spark timing, the engine throttle position parameter, together with engine spark timing control, providing increased authority over the engine response to a change in accelerator pedal position.

9. The electronic control system set forth in claim 4 wherein the desired vehicle wheel torque calculated by the first transmission control portion is a function to feed-torward term and accelerator pedal position, the feed-forward term being a table value in the controller memory storage registers corresponding to a vehicle speed term as determined by torque output shaft speed.

10. A method for controlling ratio changes in a multiple-ratio transmission for a powertrain for a wheeled vehicle, the powertrain including a throttle-controlled interval combustion engine, the transmission including a hydrokinetic torque converter with an impeller connected to the engine and a turbine connected to vehicle traction wheels through multiple-ratio gearing and a torque output shaft, the method comprising the steps of:

measuring engine speed, turbine speed and torque output shift speed;

detecting driver demand for engine torque:

calculating a commanded ratio rate during a ratio change interval based on measured speed data;

calculating the actual ratio rate during a ratio change interval;

determining an error between the commanded ratio rate and the actual ratio rate;

calculating a commanded engine torque as a function of the ratio rate error; and calculating engine control parameters in a closed-loop fashion as a function of the driver demand for engine torque.

11. The method set forth in claim 10 wherein the powertrain includes a driver-controlled accelerator pedal and the engine has a throttle that is decoupled mechanically from the accelerator pedal.

12. A method for controlling ratio changes in a multiple-ratio transmission for a powertrain for a wheeled vehicle, the powertrain including a throttle-controlled interval combustion engine, the transmission including a hydrokinetic torque converter with an impeller connected to the engine and a turbine connected to vehicle traction wheels through multiple-ratio gearing and a torque output shaft, the method comprising the steps of:

measuring engine speed, turbine speed and torque output shaft speed;

detecting driver demand for engine torque;

calculating a commanded ratio rate during a ratio change interval based oil measured speed data;

calculating the actual ratio rate during a ratio change interval;

calculating a desired traction wheel torque as a function of the driver demand for engine torque;

calculating a friction element pressure in an open-loop fashion based upon the desired traction wheel torque;

determining an error between the commanded ratio rate and the actual ratio rate;

calculating a commanded engine torque as a function of ratio rate error; and calculating engine control parameters in a closed-loop fashion as a function of the driver demand for engine torque.

13. The method set forth in claim 12 wherein the powertrain includes a driver-controlled accelerator pedal and the engine has a throttle that is decoupled mechanically from the accelerator pedal.

* * * * *